United States Patent
Chou et al.

(10) Patent No.: US 9,325,923 B2
(45) Date of Patent: Apr. 26, 2016

(54) SYSTEMS AND METHODS TO MITIGATE TRANSIENT CURRENT FOR SENSORS

(71) Applicant: Taiwan Semiconductor Manufacturing Co., Ltd., Hsin-Chu (TW)

(72) Inventors: Kuo-Yu Chou, Hsinchu (TW); Erik Tao, Hsinchu (TW); Shang-Fu Yeh, Hsinchu (TW); Calvin Yi-Ping Chao, Zhubei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 274 days.

(21) Appl. No.: 13/893,468

(22) Filed: May 14, 2013

(65) Prior Publication Data
US 2014/0266991 A1    Sep. 18, 2014

Related U.S. Application Data

(60) Provisional application No. 61/782,115, filed on Mar. 14, 2013.

(51) Int. Cl.
*H04N 5/20* (2006.01)
*H04N 5/378* (2011.01)
*H04N 5/361* (2011.01)

(52) U.S. Cl.
CPC ............... *H04N 5/378* (2013.01); *H04N 5/361* (2013.01)

(58) Field of Classification Search
CPC ....................................... H04N 5/20
USPC ................. 250/208.1; 345/55, 204; 348/308, 348/572–574
See application file for complete search history.

(56) References Cited

U.S. PATENT DOCUMENTS

| 8,269,868 | B2 | 9/2012 | Olmstead et al. |
| 8,269,872 | B2 * | 9/2012 | Okumura ...................... 348/308 |
| 2005/0212971 | A1 * | 9/2005 | Breunig ....................... 348/572 |
| 2011/0013045 | A1 | 1/2011 | Tay |
| 2011/0074994 | A1 | 3/2011 | Wakabayashi et al. |

FOREIGN PATENT DOCUMENTS

| JP | 2009118035 A | 5/2009 |
| JP | 2009225324 A | 10/2009 |
| JP | 2012151613 A | 8/2012 |

OTHER PUBLICATIONS

English machine translation of JP2009-118035.*
English translation of a Japanense Office Action dated Feb. 12, 2015 for copending Japanese Application No. 2014-049956.

* cited by examiner

*Primary Examiner* — Renee D Chavez
(74) *Attorney, Agent, or Firm* — Eschweiler & Associates, LLC

(57) ABSTRACT

A sensor system includes a pixel array, column units and a compensation circuit. The pixel array is configured to provide pixel column data. The column units are configured to generate an offset data out signal from the pixel column data. The offset data out signal includes digital offsets. The compensation circuit is configured to remove the digital offsets from the offset data out signal. The compensation circuit is also configured to generate a data out signal.

18 Claims, 9 Drawing Sheets

SYSTEMS AND METHODS TO MITIGATE TRANSIENT CURRENT FOR SENSORS

CROSS REFERENCE TO RELATED APPLICATIONS

This application claims priority to U.S. Provisional patent application Ser. No. 61/782,115 filed Mar. 14, 2013 entitled "Systems and Methods to Mitigate Transient Current for Sensors" filed in the name of Kuo-Yu Chou, et al. and is hereby incorporated by reference.

BACKGROUND

An image sensor is an integrated circuit containing an array of pixel sensors. Each pixel sensor includes a photodetector and an amplifier. One type of image sensor utilized in mobile devices is a CMOS formed image sensor. Such image sensors are relatively low cost compared with other types of image sensors, such as CCD sensors.

A typical CMOS based pixel sensor includes a photodetector, a reset transistor, a transfer transistor and a select transistor. The select transistor permits selection of individual pixel sensors. When a reset transistor and a transfer transistor are turned ON, the photodetector is cleared of integrated charge and then collects charge based on an image being sensed. The charge is converted to a digital value and is then provided as information representing a pixel of the image being sensed.

BRIEF DESCRIPTION OF THE DRAWINGS

FIG. 1 is a diagram illustrating an image sensor system in accordance with an embodiment of the disclosure.

FIG. 2 is a more detailed view of column ADC units in accordance with an embodiment of this disclosure.

FIG. 3 is a diagram illustrating a column ADC unit in accordance with an embodiment of the disclosure.

FIG. 4 is a graph illustrating signals related to a column ADC unit in accordance with an embodiment of the disclosure.

FIG. 5 is a diagram illustrating transient behavior in multiple counters.

FIG. 6 is a diagram illustrating avoidance of transient behavior in multiple counters in accordance with an embodiment of the disclosure.

FIG. 7 is another diagram illustrating avoidance of transient behavior in multiple counters in accordance with an embodiment of the disclosure.

FIG. 8 is a block diagram illustrating a compensation component in accordance with an embodiment of the disclosure.

FIG. 9 is a flow diagram illustrating a method of mitigating transient current and transient behavior in sensors utilizing multiple counters.

DETAILED DESCRIPTION

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one ordinary skill in the art, that one or more aspects described herein may be practiced with a lesser degree of these specific details. In other instances, known structures and devices are shown in block diagram form to facilitate understanding.

FIG. 1 is a diagram illustrating an image sensor system 100 in accordance with an embodiment of the disclosure. The system 100 mitigates peak transient currents during image sensing as compared with other approaches.

Transient currents occur in sensor systems from a variety of factors. An average transient current is an average transient current over a period of time. A peak transient current is an almost instantaneous or short term "peak" current. A sensor current can have a relatively low average transient current, yet a relatively large peak transient current. If a sensor system fails to account for peak transient currents in its design, erroneous data, failed circuits and the like. One technique to account for the peak transient currents is to "oversize" system components so that they can sufficiently handle suck peak currents. Another technique, described here, is to mitigate the occurrence of peak transient currents. Of course, it is appreciated that using both techniques in combination and/or separately is contemplated in this disclosure.

The system 100 includes a row circuit 102, a pixel array 104, a ramp component 106, a digital control circuit 108, column ADC units 110, a horizontal scan component 112, and a compensation circuit 114. The row circuit 102 controls operation of the pixel array 104. The row circuit 102 generates one or more array control signals 118 to selected and utilize a row of pixels. The row circuit 102 is operated by a control signal 116 from the digital control circuit 108.

The pixel array 104 includes an array of pixel sensors. The array 104 is arranged in rows and columns in a matrix form and includes a specified number of rows and another specified number of columns. A suitable and/or selected number of columns and rows are present. In one example, there are 3,200 columns and 1,600 rows.

Each pixel sensor is associated with a row and a column. The sensors are CMOS based and are configured to capture charge based on an image being sensed. The captured charge is provided by column as pixel column data 128, in an analog format.

The pixel array 104, in this example, is selected by rows according to the array control signals 118. Generally, the column data 128 includes individual analog data or charge for each column of the array 104. Thus, the provided pixel column data 128 corresponds to the selected row and includes multiple signals, one for each column. The individual column charge data corresponds to a single pixel sensor of the array 104.

The digital control circuit 108 is configured to control components of the system 100, including the row circuit 102, the column ADC units 110, the ramp component 106, and the horizontal scan component 112. The digital control circuit 108 operates using an internal clock signal (not shown). The digital control circuit 108 generates the control signal 116, utilized by the row circuit 102 and the ramp component 106. The control signal 116 is utilized to select rows of the array 104 and to trigger generation of signals by the ramp component 106.

The digital control circuit 108 is also configured to generate column control signals 122 to the column ADC units 110. The column control signals 122 are operative to control individual units. Additionally, the digital control circuit 108 generates a horizontal scan signal 124, which serves to operate the horizontal scan component 112.

The ramp component 106 is configured to generate a ramp signal 120, which facilitates converting analog column data into digital data, in the form of an offset data out signal 130.

Figure 1:
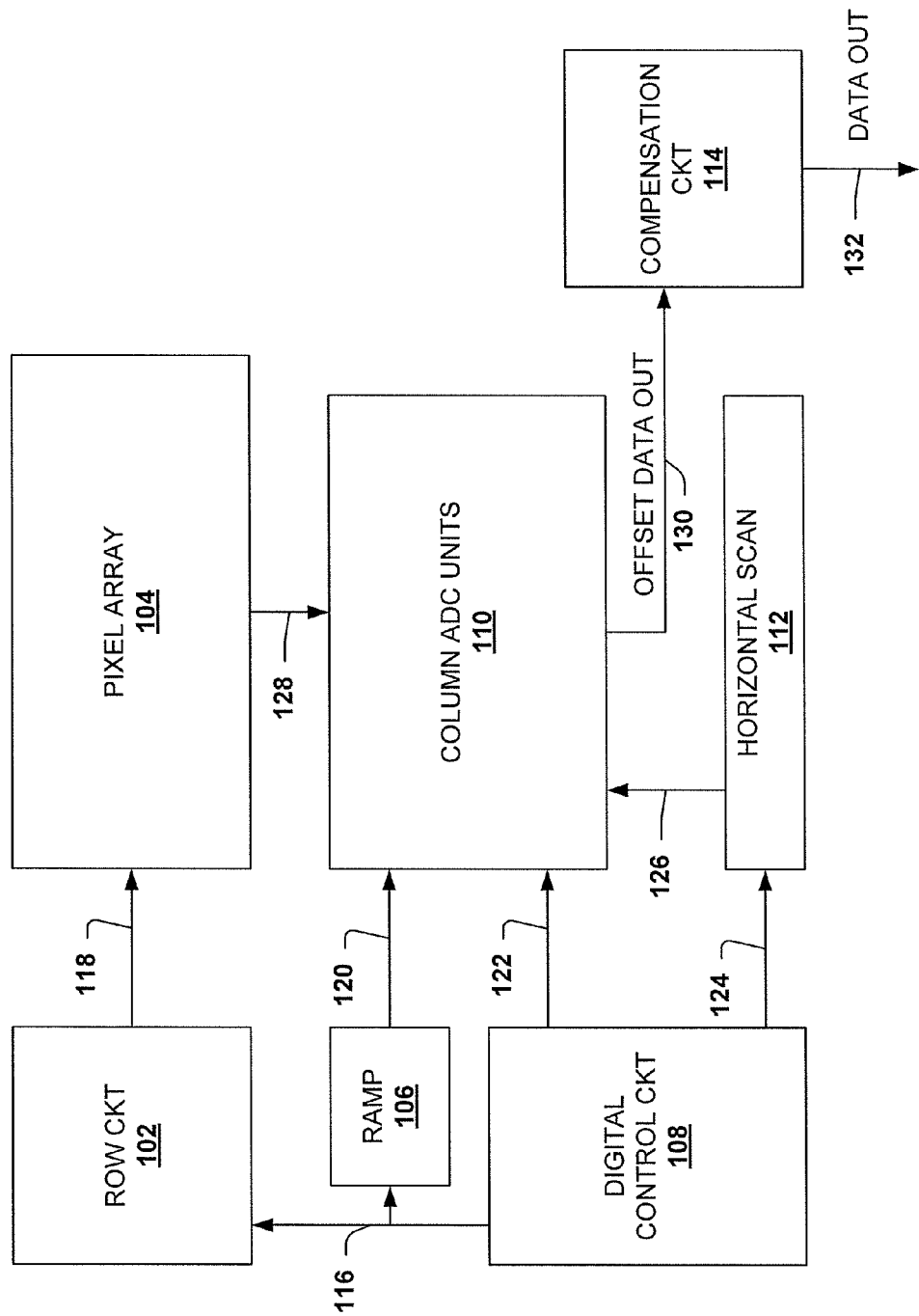

The ramp signal 120 is provided to individual column units and includes a low, flat portion, a ramp portion, and an upper, flat portion.

The column ADC units 110 include individual column ADC units. Each unit includes a comparator and an offset counter, shown and described in subsequent figures. The comparator compares the ramp signal 120 with the pixel column data 128. The offset counter counts a number of cycles or periods until the ramp signal 120 reaches the pixel column data 128 for the particular column. The count generated by the counter is a digital representation of the pixel column data 128 and is provided by the collective column ADC units 110 as the offset data out signal 130. However, the starting point and/or polarity of the count is varied or offset. As a result, peak transient currents are mitigated.

The horizontal scan component 112 is configured to generate a column scan signal 126 in response to the horizontal scan signal 124. The column scan signal 126 selects or scans units of the column ADC units to generate the offset data out signal 130. Each column or unit is selected in order such that the offset data out signal 130 includes N bits of data for M column units.

The compensation circuit 114 is configured to remove offsets, including polarity shifts, from the offset data out signal 130 to generate a data out signal 132. The data out signal 132 digitally represents image information from the selected row of pixels for the array 104. The compensation circuit 114 analyzes and/or segments the offset data out signal 130 into column/unit data. Each column unit data is applied a compensation offset, including a polarity compensation. The compensated column unit data is collected and provided as the data out signal 132.

Figure 2:
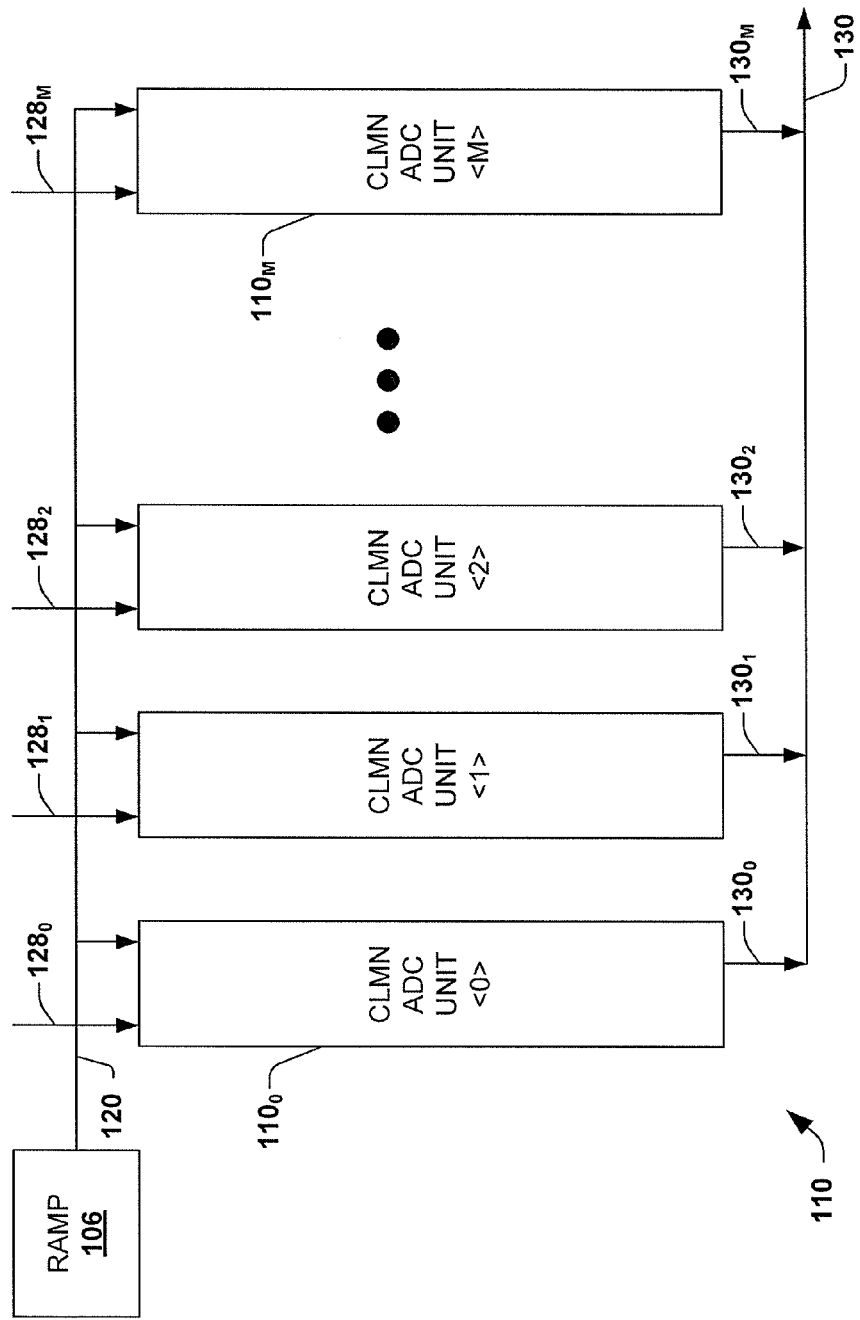

FIG. 2 is a more detailed view of column ADC units 110 in accordance with an embodiment of this disclosure. This view identifies an example of a suitable arrangement of individual column ADC units. However, it is appreciated that other arrangements are permitted.

Here, there are M column units and each unit is designated starting with $110_0$ and ending at $110_M$. There are also individual pixel column data represented as starting with $128_0$ and ending at $128_M$. Each column unit, such as $110_0$, receives a ramp signal 120 and the individual pixel column data, such as $128_0$. The ramp signal 120 is generated by the ramp component 106. Each column unit generates a component of the offset data out signal 130. The components are each referred to as a column offset data signal and designated starting with $130_0$ and ending at $130_M$.

The column units utilize a counter based on a flip-flop design. Such counters utilize increased amounts of current when all or substantially all flip-flops within the counter switch from one value to another. This switching the value of all or substantially all flip-flops within a counter is referred to as transient behavior. The resulting increased current is referred to as transient current or peak transient current.

The transient current or peak transient current is substantially much larger than other typical currents utilized by the counters. As a result, the transient currents can overpower and/or damage other components within the systems. Further, the transient current can be sufficiently large so as to impact functional operation of the sensor system and/or other circuits.

The column units $110_0$ to $1110_M$ mitigate the transient current by mitigating the occurrence of the transient behavior. This is accomplished using a suitable mechanism that reduces the occurrence of the transient behavior. In one example of a suitable mechanism, counter starting points are offset (from zero) by varied offset amounts. This reduces the likelihood of multiple counters transitioning all or nearly all of their flip-flops at the same time. In another example of a suitable mechanism, a polarity of the starting point and/or operation of the counter is modified or alternated. Thus, some of the counters count down while others count up. As a result, the likelihood of multiple counters transitioning all or nearly all of their flip-flops at the same time is reduced.

Figure 3:
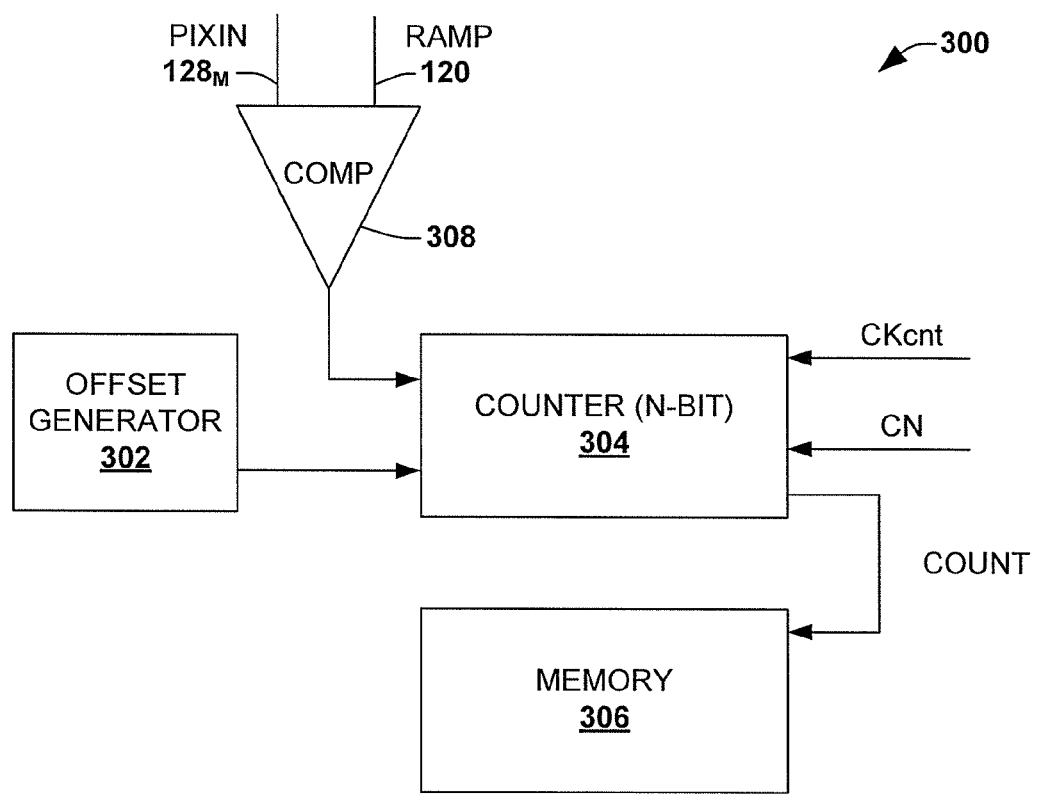

FIG. 3 is a diagram illustrating a column ADC unit 300 in accordance with an embodiment of the disclosure. The unit 300 is shown in an example arrangement, however it is appreciated that other arrangements are contemplated. The unit 300 can be utilized for one of the column ADC units 130, described above.

The unit 300 includes an offset generator 302, a counter 304, a memory 306, and a comparator 308. The offset generator 302 provides an offset as an input to the counter. The offset indicates a counter starting point and/or a polarity setting for the counter 304. For example, the offset could be a value of 8 in one example meaning that the counter 304 is to start counting at 8, instead of starting at 0. In another example, the offset could be −1, indicating that the counter 304 is to count down, instead of up. In another example, the offset controls a polarity of the comparator 308.

The comparator 308 compares a PIXIN signal from a pixel array, such as the array 104, with a ramp signal 120. In this example, the ramp signal 120 increases from a lower value to a higher value. The comparator 308 generates a LOW value until the ramp signal 120 is equal or higher than the PIXIN signal. At that point, the comparator 308 generates a HIGH value until a next count cycle is reached, and the ramp signal 120 returns to the lower value. However, it is appreciated that other suitable configurations are permitted, such as an example where the comparator 308 generates a HIGH value until the ramp signal 102 is less than the PIXIN signal.

The counter 304 receives the output of the comparator 308, the offset, a counter control signal CN (up count or down count or hold data), and a clock signal CK. The counter 304 generates an N bit COUNT, which indicates a number of clock CK cycles for which the comparator output is HIGH or indicates that the ramp signal 120 is at or above the PIXIN signal.

The memory 306 receives the COUNT and at least temporarily stores the count. The memory 306 provides the COUNT in response to a signal from a scan component, such as the horizontal scan component 112, described above.

Figure 4:
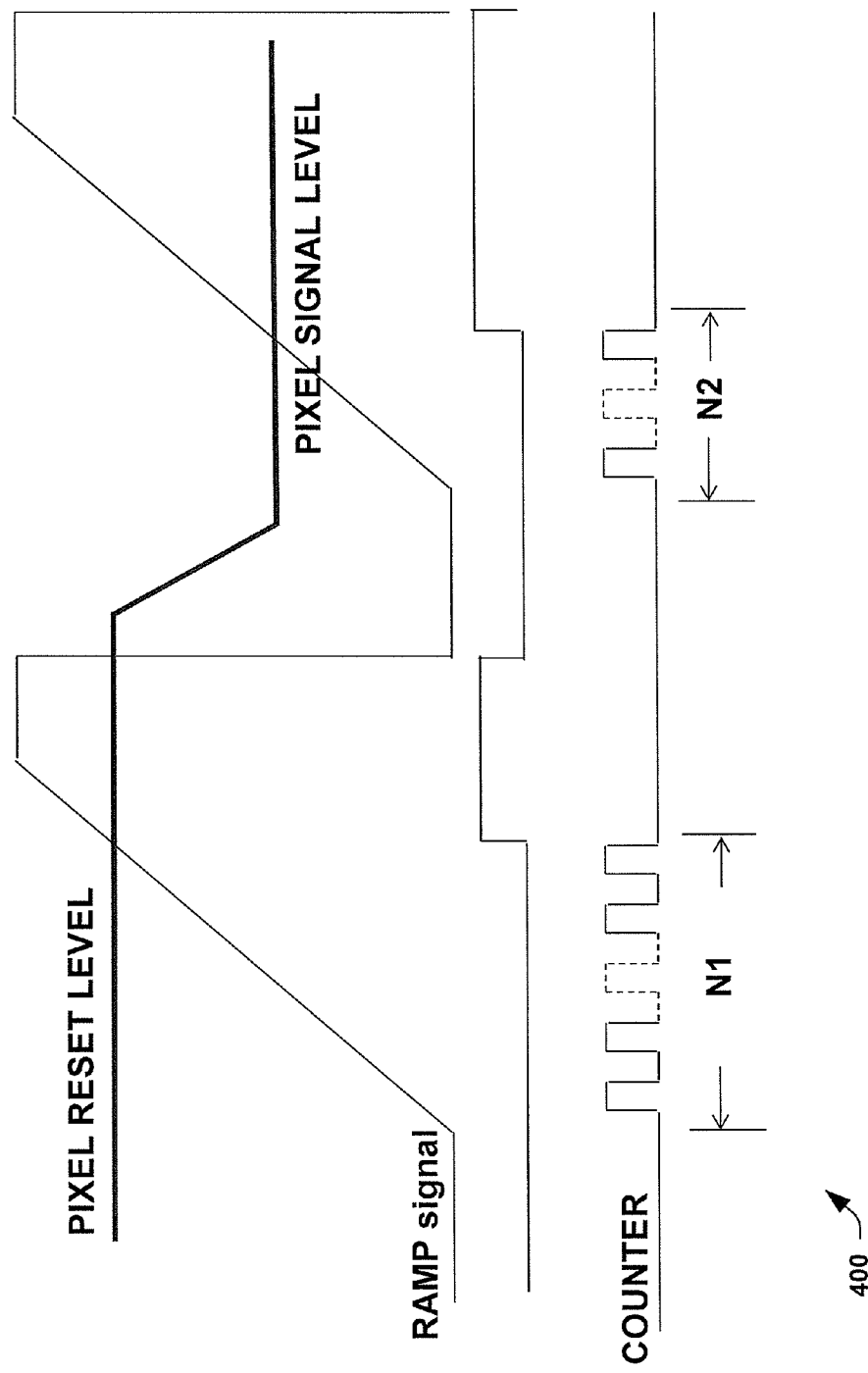

FIG. 4 is a graph 400 illustrating signals related to a column ADC unit in accordance with an embodiment of the disclosure. The graph 400 is provided as an example to illustrate signals and signal values that may be found in column ADC units.

The graph 400 shows signals progressing from left to right along an x-axis and signal values along a y-axis. The graph 400 includes a PIXEL signal, a RAMP signal, and a count signals COUNTER. The PIXEL signal is shown having a PIXEL reset level and a PIXEL signal level. The PIXEL reset level is a level wherein the corresponding or connected pixel sensor is being reset in preparation for collecting charge. The PIXEL reset level resets the pixel sensor to a reference level so that image sensing can be performed. The PIXEL signal level is provided in response to an exposure and represents charge collected for the pixel sensor. The COUNTER signal represents an output of a counter, such as the counter 304 of FIG. 3.

As the RAMP signal starts increasing from the lower level towards the higher level, the COUNTER signal generates a number of pulses, also referred to as the count. The count is a digital representation of charge present on the pixel sensor.

For the PIXEL reset level, it is shown that the count equals 5 (five) for the time period designated by N1. For the PIXEL signal level, it is shown that the count equals 3 (three) for the time period designated by N2. Thus, a final count, also the image signal, equals pixel reset—pixel signal level=N1−N2. For the pixel reset level, the COUNTER signal yields a count of N1, 5 in this example. This count is also referred to as a pixel reset level count. For the pixel signal level, the counter signal yields a count of N2, 3 in this example. The count for N2 is also referred to as a pixel signal level count. In this example the count N1 is obtained by counting UP and the N2 is obtained by counting DOWN.

However, due to the use of an offset generator, such as the offset generator 302 described above, the count provided by the counter is modified. For example, if there is an offset of 5, the count provided by the time period designated by N1 is 10.

Figure 5:
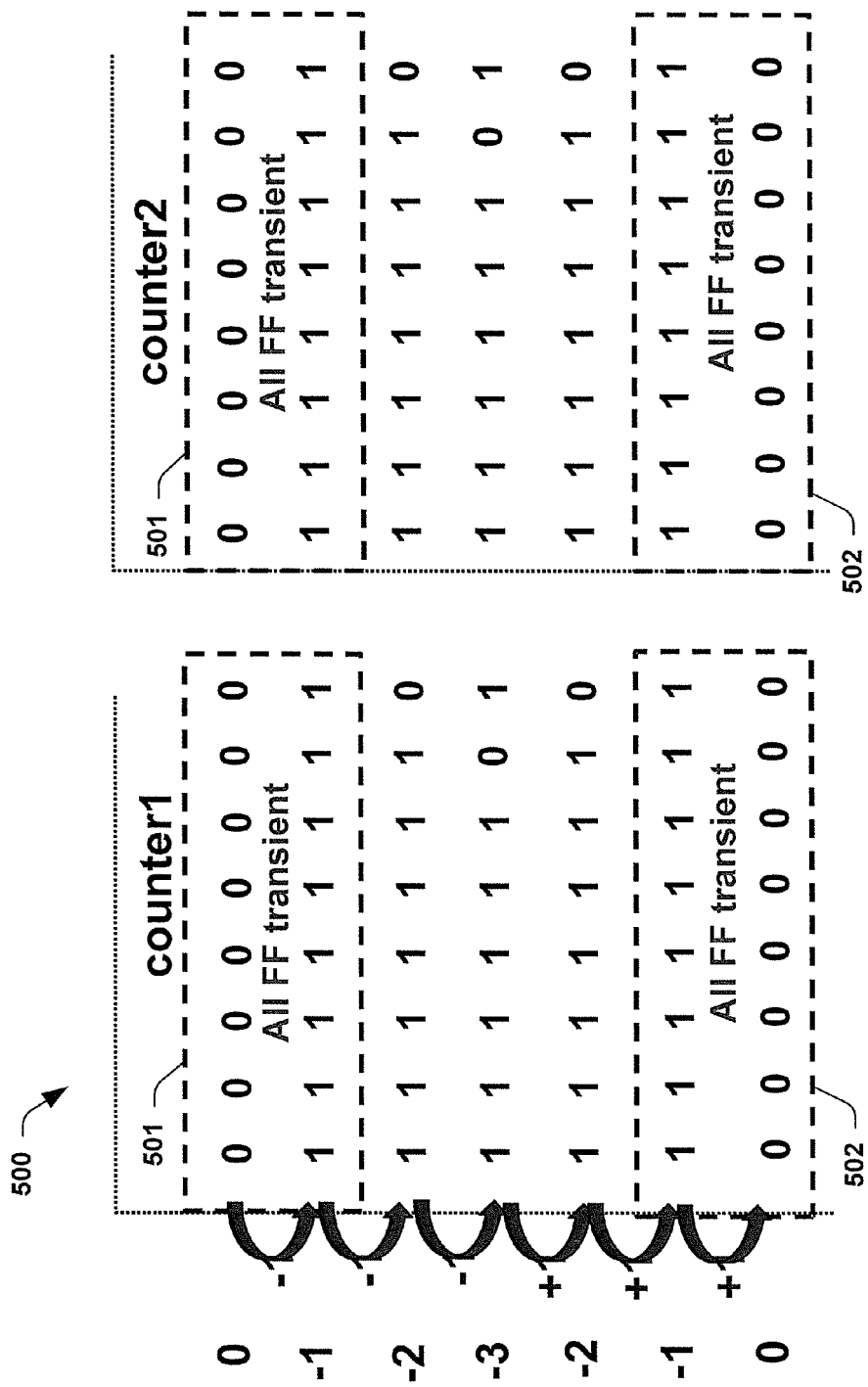

FIG. 5 is a diagram illustrating transient behavior in multiple counters 500. As described above, transient behavior occurs when all or substantially all flip-flops within a counter transient or switch values. Here, the multiple counters 500 include counter1 and counter2.

The counter1 and counter2 start counting from an initial value of 0 and count down, indicated by −1. As a result, all flip-flops within the counter1 and the counter2 transition from 0 to 1 resulting in a transient behavior event 501 and increased transient currents. The counter1 and counter2 continue counting down to a value of −3. Then, the count mode or polarity switches to count up, indicated by +1. Thereafter, both counters count up and transition from −1 to 0. At this point, transient behavior again occurs resulting in a second transient behavior event 502 and increased transient currents.

Figure 6:
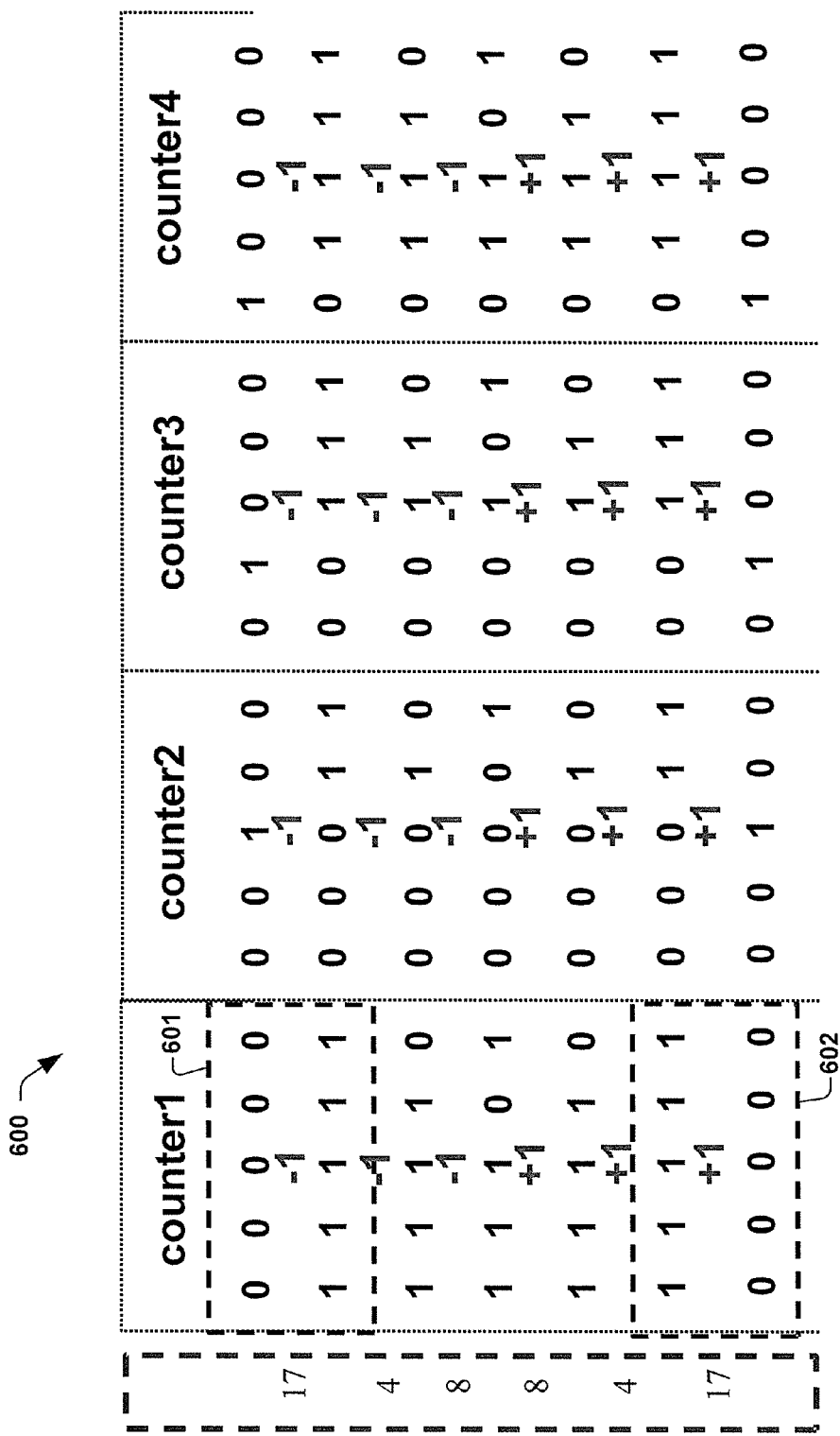

FIG. 6 is a diagram illustrating avoidance of transient behavior in multiple counters 600 in accordance with an embodiment of the disclosure. The counters 600 utilize varied offsets to mitigate the occurrence of transient behavior. The counters 600 can be utilized in the systems and figures described above, including, but not limited to the counter 304.

The counters 600 include counter1, counter2, counter3, and counter4. The counters 600 have varied offsets for starting their count. The counters 600 are associated with column ADC units, such as described above. The counter1 starts at '00000', the counter2 starts at '00100', the counter3 starts at '01000', and the counter4 starts at '10000'. The counters 600, in this example, operate with +1 polarity (count up) and −1 polarity (count down).

The counter1 starts counting down from '00000' and all its flip-flops transition at a first transient event 601. However, the other counters have varied offsets and, as a result, less than all of the flip-flops (17 of 20) exhibit transient behavior at the same time as the counter1. As a result, transient current is mitigated due to the varied offsets compared with other approaches.

A second transient event 602 occurs on the counter1 counting up from '11111'. Here, again, all the flip-flops present within the counter1 transition, but less than all of the other flip-flops of the other counters transition. As a result, transient current is mitigated.

Figure 7:
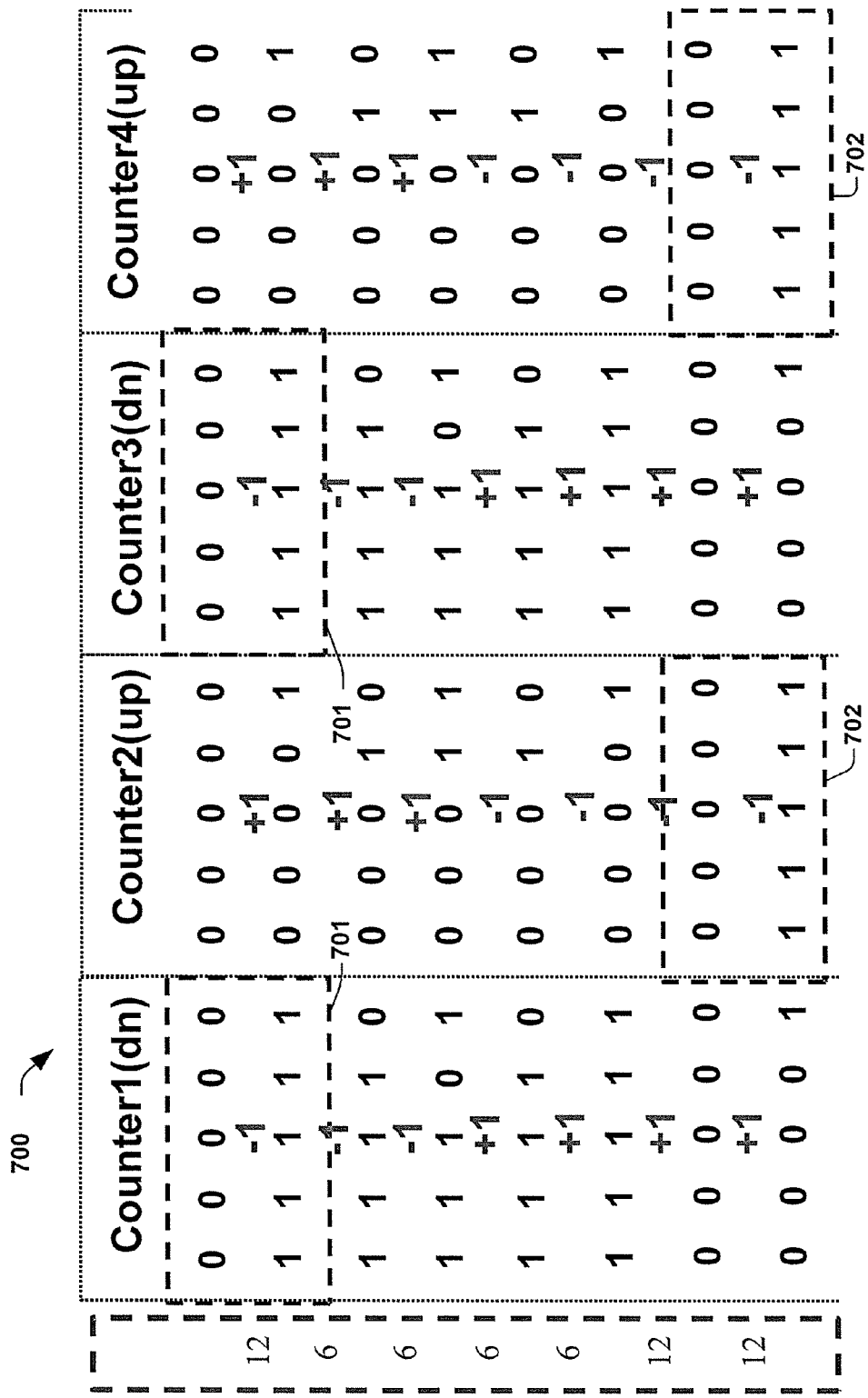

FIG. 7 is another diagram illustrating avoidance of transient behavior in multiple counters 700 in accordance with an embodiment of the disclosure. The counters 700 utilize varied offsets in the form of differing polarity, also referred to as count direction. The counters 700 can be utilized in the systems and figures described above, including, but not limited to the counter 304.

The counters 700 include counter1, counter2, counter3, and counter4. The counters 700 have varied offsets in the form of polarity. The counter1 and counter3 start with a −1 polarity whereas the counter2 and counter4 start with a +1 polarity. The counters 700, all the present counters in this example, start with values of '00000'.

The counters counter1 and counter3 transition all their flip-flops at a first transient event 701. A total of 12 flip-flops out of 20 total transition. Because the counter2 and counter4 have opposite polarity or count direction, not all of their flip-flops transition. Similarly, the counters counter2 and counter4 transition all their flip-flops at a second transient event 702. Again, only 12 flip-flops out of 20 total transition. As a result, transient currents are mitigated.

It is also appreciated that the offsets shown in FIGS. 6 and 7 can be combined to further mitigate transient current produced by transient behavior.

Figure 8:
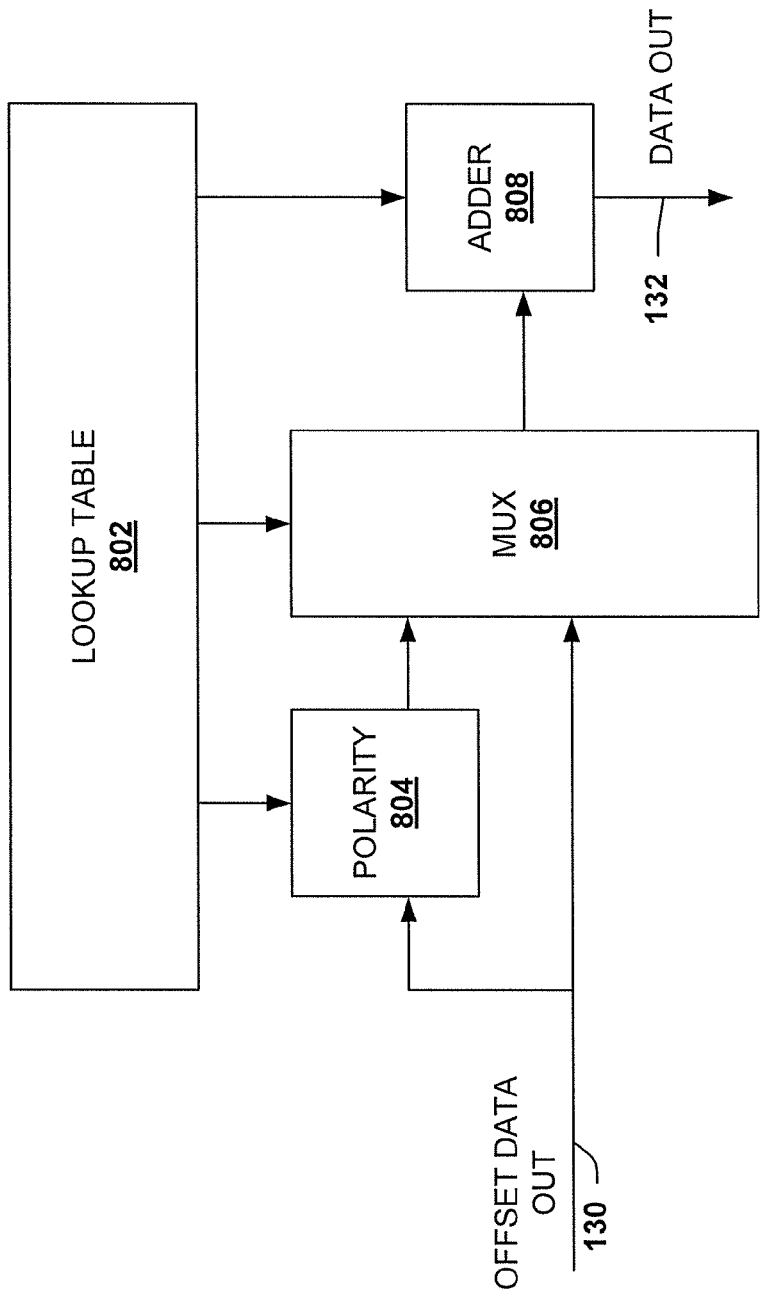

FIG. 8 is a block diagram illustrating a compensation component 800 in accordance with an embodiment of the disclosure. The compensation component 800 can be utilized for the compensation component 114 in FIG. 1. The compensation component 800 removes offsets, including polarities, from a stream of data and provides a data out signal.

The compensation component 800 includes a lookup table 802, a polarity component 804, a multiplexor 806, and an adder 808. The offset data out signal 130 includes image sensing data, in digital form, from a pixel array. However, the offset data out 130 includes information that is offset due to varied counter starting values and/or polarity (count direction). As a result, the offset data out signal 130 is modified before it can be utilized. The compensation component 800 removes the offsets from the offset data out signal 130 in order to provide the data out signal 132.

The mux 806 and the polarity component 804 receive the offset data out 130 from a plurality of column ADC units. Thus, the offset data out signal 130 includes signal portions per column unit. The polarity component 804 references the lookup table 802 for each signal portion and obtains a polarity correction. In some cases, the polarity correction is null or OFF indicating there was no polarity offset in the generation of the signal portion. In others, the polarity correction is ON, which indicates that polarity medication is required for the signal portion. The polarity component 804 provides a polarity correction signal to the mux component 806.

The mux component 806 receives the offset data out signal 130 and the polarity correction signal. The mux component 806 references the lookup table 802 for each signal portion and obtains a mux value, per portion. The mux value provides a polarity based adjustment. The mux component 806 combines each signal portion with the mux value utilizing the polarity correction signal in order to provide a polarity corrected signal.

The adder 808 receives the polarity corrected signal and references the lookup table 802 for each signal portion and obtains an offset value, per portion. The offset value indicates that starting value or offset used by a counter within the column unit associated with a given signal portion. For example, the counter2 described in FIG. 6 utilized a starting value of '00100'. The adder 808 removes the counter starting value from the polarity corrected signal and generates the data out signal 132. The data out signal 132 has offsets, including polarities, removed. Thus, the data out signal 132 can be utilized for image capture and the like.

It is appreciated that the compensation component 800 is described with the above components for illustrative purposes. It is noted that other arrangements and varied components are contemplated and useable for the compensation component 800.

Figure 9:
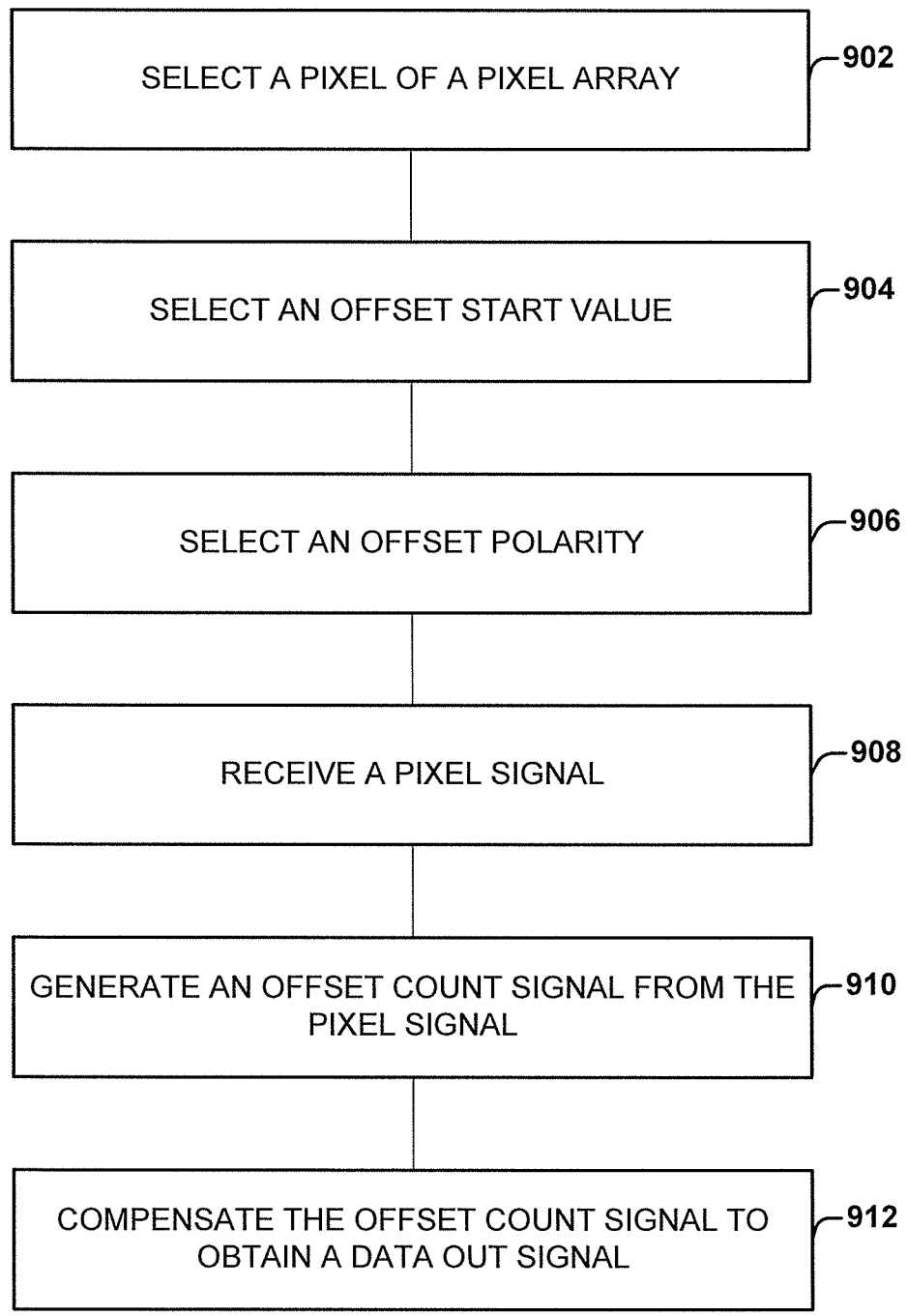

FIG. 9 is a flow diagram illustrating a method 900 of mitigating transient current and transient behavior in sensors utilizing multiple counters. The method 900 utilizes offsets for multiple counters to mitigate the switching of all or nearly all flip-flops within the multiple counters at the same time.

The method 900 begins at block 902 wherein a pixel of a pixel array is selected. The pixel array is arranged in rows and columns. Typically, a row circuit selects a row of the array and a horizontal scan component selects a column, both the row and the column selecting the pixel.

The method 900 continues at block 904 wherein an offset start value for a counter of a column unit is selected. The offset start value is generally a non-zero number and is selected so that the counter has a varied start value compared with one or more other counters associated with the pixel array. The offset start value includes both positive and negative values and zero.

An offset polarity is selected for the counter at block 906. The offset polarity indicates a count direction or polarity for the counter. A +1 designation indicates counting up whereas a −1 designation indicates counting down. The offset polarity is varied from one or more of the other counters associated with the pixel array.

A pixel signal is received from the selected pixel at block 908. The pixel signal is in analog form and typically indicates or corresponds with an amount of charge collected by a photodetector over a period of time.

An offset count signal is generated from the pixel signal at block 910. The offset count signal is generated using the offset start value and the offset polarity. The offset count signal is generated by counting clocks or clock cycles for a period of time in which a ramp signal is below the pixel signal. Generally, a comparator is used to compare the pixel signal with the ramp signal, which is provided by a ramp source. The comparator generates a first value until the ramp signal exceeds the pixel signal. The comparator generates a second value at that point. The counter counts the cycles until the second value is provided by the comparator.

The counter starts counting at the offset start value and counts in a direction specified by the offset polarity. As a result, the counter generates the offset count signal while mitigating the occurrence of transient current. This is due to the fact that the one or more other counters have varied offset start values and/or offset polarity values.

The offset count signal is compensated at block 912 to obtain a data out signal for the selected pixel. The data out signal is a digital representation of an image collected by the selected pixel. The offset count signal is compensated by modifying the signal according to the offset start value and the offset start polarity. These values can be stored in a lookup table. In one example, these values are stored in a lookup table and accessed to compensate the signal and, also, to generate the signal in block 910.

It is understood that the method 900 can be repeated for other pixels in the array to obtain additional image information. Typically, the row circuit selects a row and a horizontal scan component signals and collects the offset data out signals from column units.

It will be appreciated that while reference is made throughout this document to exemplary structures in discussing aspects of methodologies described herein (e.g., the structure presented in above figures, while discussing the methodology set forth in FIG. 7), that those methodologies are not to be limited by the corresponding structures presented. Rather, the methodologies (and structures) are to be considered independent of one another and able to stand alone and be practiced without regard to any of the particular aspects depicted in the Figs.

Also, equivalent alterations and/or modifications may occur to those of ordinary skill in the art based upon a reading and/or understanding of the specification and annexed drawings. The disclosure herein includes all such modifications and alterations and is generally not intended to be limited thereby. For example, although the figures provided herein, are illustrated and described to have a particular doping type, it will be appreciated that alternative doping types may be utilized as will be appreciated by one of ordinary skill in the art.

A sensor system includes a pixel array, column units and a compensation circuit. The pixel array is configured to provide pixel column data. The column units are configured to generate an offset data out signal from the pixel column data. The offset data out signal includes digital offsets. The compensation circuit is configured to remove the digital offsets from the offset data out signal. The compensation circuit is also configured to generate a data out signal.

A column unit includes an offset generator, a comparator, and a counter. The offset generator is configured to generate an offset signal. The comparator is configured to generate a comparator output signal according to a pixel input signal and a ramp signal. The counter is coupled to the offset generator and the comparator. The counter is configured to generate a count signal in response to the comparator output signal.

A method of generating data for a sensor is disclosed. A pixel of a pixel array is selected. An offset start value is selected for a counter of a column unit. An offset polarity is selected for the counter. A pixel signal is received from the selected pixel. An offset count signal is generated from the pixel signal using the offset start value and the offset polarity.

While a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

What is claimed is:

1. A sensor system comprising:
   a pixel array comprising a plurality of pixels arranged in a plurality of columns and a plurality of rows;
   a plurality of column units coupled to the plurality of columns, respectively, and including a plurality of counters, respectively, wherein the plurality of counters are configured to increment their respective count values based on pixel signals from pixels of the respective columns, and are further configured to produce a plurality of peak transient currents, respectively, at a transition between a first pre-determined count value and a second pre-determined count value for the respective counters;
   wherein a peak transient current for a first column unit occurs when a predetermined number of bits of a counter of the first column unit transition from a logical-0 state to a logical-1 state, or vice versa;
   wherein the counter of the first column unit is configured to count according to a different count sequence than other counters in the other respective column units; and wherein the counters are configured to deliver the plurality of peak transient currents at different times from one another.

2. The sensor system of claim 1, wherein the pixel signals include digital information corresponding to a captured image.

3. The sensor system of claim 1, wherein each pixel of the array includes a photodetector.

4. The sensor system of claim 1, further comprising a row circuit configured to select a row of the pixel array, wherein the selected row generates the pixel signals.

5. The sensor system of claim 1,
wherein the counter of the first column unit is initialized to start counting at a first initial count value that differs from initial count values for other counters in the other respective column units.

6. The sensor system of claim 5, wherein the pre-determined number of bits is all bits of the counter.

7. The sensor system of claim 1, wherein the plurality of column units further include a plurality of comparators, respectively, having respective comparator outputs coupled to input terminals of the plurality of counters, respectively.

8. The system of claim 7, further comprising:
a ramp circuit having a ramp circuit output coupled to respective inputs of the plurality of comparators;
wherein a first counter is configured to increment its count value so long as a predetermined relationship continuously exists between the pixel signal received by the first counter and a ramp signal provided by the ramp circuit.

9. A sensor system comprising:
a pixel array comprising a plurality of pixels arranged in a plurality of columns and a plurality of rows; and
a plurality of column units coupled to the plurality of columns, respectively, and including a plurality of counters, respectively, wherein the plurality of counters are configured to increment their respective count values based on pixel signals from pixels of the respective columns, and are further configured to produce a plurality of peak transient currents, respectively, at a transition between a first pre-determined count value and a second pre-determined count value for the respective counters;
wherein a peak transient current for a first column unit occurs when a predetermined number of bits of a counter of the first column unit transition from a logical-0 state to a logical-1 state, or vice versa, wherein the pre-determined number of bits is all bits of the counter;
wherein the counter of the first column unit is initialized to start counting at a first initial count value that differs from initial count values for other counters in the other respective column units;
wherein the counters are configured to deliver the plurality of peak transient currents at different times from one another.

10. The sensor system of claim 9, wherein the plurality of column units further include a plurality of comparators, respectively, having respective comparator outputs coupled to input terminals of the plurality of counters, respectively.

11. The sensor system of claim 10, further comprising:
a ramp circuit having a ramp circuit output coupled to respective inputs of the plurality of comparators;
wherein a first counter is configured to increment its count value so long as a predetermined relationship continuously exists between the pixel signal received by the first counter and a ramp signal provided by the ramp circuit.

12. A sensor system comprising:
a pixel array comprising a plurality of pixels arranged in a plurality of columns and a plurality of rows;
a plurality of column units coupled to the plurality of columns, respectively, and including a plurality of counters, respectively, wherein the plurality of counters are configured to increment their respective count values based on pixel signals from pixels of the respective columns, and are further configured to produce a plurality of peak transient currents, respectively, at a transition between a first pre-determined count value and a second pre-determined count value for the respective counters;
wherein the plurality of column units further include a plurality of comparators, respectively, having respective comparator outputs coupled to input terminals of the plurality of counters, respectively; and
a ramp circuit having a ramp circuit output coupled to respective inputs of the plurality of comparators;
wherein a first counter is configured to increment its count value so long as a predetermined relationship continuously exists between the pixel signal received by the first counter and a ramp signal provided by the ramp circuit;
wherein the counters are configured to deliver the plurality of peak transient currents at different times from one another.

13. The sensor system of claim 12, wherein a peak transient current for a first column unit occurs when at least substantially all of the bits of the counter transition from a logical-0 state to a logical-1 state, or vice versa; and
wherein the first counter is initialized to start counting at a first initial count value that differs from initial count values for other counters in the other column units, and wherein the first counter counts concurrently with the other counters.

14. The sensor system of claim 12, wherein a peak transient current for a first column unit occurs when at least substantially all of the bits of the counter transition from a logical-0 state to a logical-1 state, or vice versa; and
wherein the counter of the first column unit is configured to count according to a different count sequence than other counters in other column units and wherein the first counter counts concurrently with the other counters.

15. The sensor system of claim 12, wherein a peak transient current for a first column unit occurs when a predetermined number of bits of a counter of the first column unit transition from a logical-0 state to a logical-1 state, or vice versa; and
wherein the counter of the first column unit is initialized to start counting at a first initial count value that differs from initial count values for other counters in the other respective column units.

16. The sensor system of claim 15, wherein the pre-determined number of bits is all bits of the counter.

17. The sensor system of claim 12, wherein the plurality of column units further include a plurality of comparators, respectively, having respective comparator outputs coupled to input terminals of the plurality of counters, respectively.

18. The sensor system of claim 17, further comprising:
a ramp circuit having a ramp circuit output coupled to respective inputs of the plurality of comparators;
wherein a first counter is configured to increment its count value so long as a predetermined relationship continuously exists between the pixel signal received by the first counter and a ramp signal provided by the ramp circuit.

* * * * *